(12) United States Patent
Jordan et al.

(10) Patent No.: US 9,720,495 B1
(45) Date of Patent: Aug. 1, 2017

(54) AGGREGATING ONLINE ACTIVITIES

(71) Applicant: Google Inc., Mountain View, CA (US)

(72) Inventors: Timothy Emmet Jordan, Alameda, CA (US); Paul Lindner, Oakland, CA (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 13/664,331

(22) Filed: Oct. 30, 2012

Related U.S. Application Data

(60) Provisional application No. 61/663,485, filed on Jun. 22, 2012.

(51) Int. Cl.
*G06F 3/01* (2006.01)

(52) U.S. Cl.
CPC ..................... *G06F 3/01* (2013.01)

(58) Field of Classification Search
CPC . G06Q 10/10; G06F 3/0481; G06F 17/30424; H04N 7/15; H04L 12/1813; H04L 12/581; H04L 41/0246; H04L 51/046; H04L 51/10; H04L 63/08
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,609,089 B1 * | 8/2003 | Ball et al. | 704/9 |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,725,472 B2 * | 5/2010 | Uchiyama | 707/758 |
| 7,742,468 B2 | 6/2010 | Vagelos | |
| 8,645,682 B2 * | 2/2014 | Biswas | 713/153 |
| 9,092,816 B1 * | 7/2015 | Sriram | G06Q 30/0631 |
| 2002/0137490 A1 | 9/2002 | Gallant | |
| 2002/0143874 A1 | 10/2002 | Marquette et al. | |

(Continued)

FOREIGN PATENT DOCUMENTS

| | | |
|---|---|---|
| EP | 1226559 | 7/2006 |
| WO | WO02079984 | 10/2002 |

(Continued)

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Jeffrey A Gaffin
*Assistant Examiner* — Mandrita Brahmachari
(74) *Attorney, Agent, or Firm* — Patent Law Works LLP

(57) ABSTRACT

The disclosure includes a system and method for providing third party modifications to a user history. The system includes a processor and a memory storing instructions that, when executed, cause the system to: transmit a first input specifying a type of user interactions to be shared; receive a set of second inputs associated with user interactions with a first service; determine which of the set of second inputs with the first service is of the specified type; and transmit a set of user activity data describing the user interactions with the first service that are of the specified type.

20 Claims, 12 Drawing Sheets

(56) References Cited

U.S. PATENT DOCUMENTS

| | | | |
|---|---|---|---|
| 2004/0220893 A1* | 11/2004 | Spivack | G06F 9/4443 706/46 |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0200794 A1* | 9/2006 | Robertson et al. | 717/103 |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0307018 A1* | 12/2009 | Chappell et al. | 705/5 |
| 2009/0307345 A1* | 12/2009 | Carter | G06Q 30/02 709/224 |
| 2010/0132049 A1* | 5/2010 | Vernal et al. | 726/27 |
| 2010/0318571 A1* | 12/2010 | Pearlman | H04L 63/104 707/784 |
| 2011/0004831 A1* | 1/2011 | Steinberg | H04N 21/454 715/753 |
| 2011/0010243 A1* | 1/2011 | Wilburn et al. | 705/14.53 |
| 2011/0055017 A1 | 3/2011 | Solomon et al. | |
| 2011/0083101 A1 | 4/2011 | Sharon et al. | |
| 2011/0098156 A1 | 4/2011 | Ng et al. | |
| 2011/0137902 A1* | 6/2011 | Wable | G06F 17/30867 707/737 |
| 2011/0153421 A1* | 6/2011 | Novikov | G06Q 30/02 705/14.52 |
| 2011/0231240 A1 | 9/2011 | Schoen et al. | |
| 2012/0072835 A1 | 3/2012 | Gross et al. | |
| 2012/0158455 A1 | 6/2012 | Pathak et al. | |
| 2012/0239763 A1* | 9/2012 | Musil | G06Q 50/01 709/206 |
| 2012/0290399 A1* | 11/2012 | England | G06Q 30/0282 705/14.66 |
| 2013/0006980 A1 | 1/2013 | Frumin | |
| 2013/0014258 A1 | 1/2013 | Williams | |
| 2013/0073983 A1* | 3/2013 | Rasmussen et al. | 715/753 |
| 2013/0080523 A1* | 3/2013 | Rubinstein | H04L 51/32 709/204 |
| 2013/0212497 A1* | 8/2013 | Zelenko et al. | 715/760 |
| 2013/0239017 A1* | 9/2013 | Shedletsky, III | A63F 13/00 715/753 |
| 2013/0268973 A1* | 10/2013 | Archibong | G06Q 50/01 725/51 |
| 2013/0290439 A1 | 10/2013 | Blom | |

FOREIGN PATENT DOCUMENTS

| | | |
|---|---|---|
| WO | WO-2006-127919 | 11/2006 |
| WO | WO-2011-112725 | 9/2011 |
| WO | WO2012-056326 | 5/2012 |

OTHER PUBLICATIONS

Agarwal et al., "Enabling Real-Time User Interests for Next Generation Activity-Oriented Social Networks," Thesis submitted to the Indian of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

(56) References Cited

OTHER PUBLICATIONS

Wenger et al., "Technology for Communities," CEFRIO Book Chapter v 5.2, Jan. 18, 2005, pp. 1-15.
International Search Report and Written Opinion for PCT Application No. 2013/047133, dated Mar. 4, 2014, 14 pages.
Extended European Search Report for PCT/US2013047133, mailed on Feb. 3, 2016, 7 pages.

* cited by examiner

AGGREGATING ONLINE ACTIVITIES

CROSS REFERENCE

The present application claims priority from U.S. Provisional Patent Application Ser. No. 61/663,485, entitled "Aggregating Online Activities" filed on Jun. 22, 2012, which is incorporated herein by reference.

BACKGROUND

The specification relates to aggregating online activities to modify a user history.

Over the last decade, social networking has become increasingly popular. A user may share online activities with other users including friends, family members, etc., via a social feed posted on a social network. A user may also interact with a variety of different third party websites. For example, the user may read an article on a third party website and post a comment about the article on the third party website. It may be highly desirable to incorporate the user interactions with different third party websites into the user's social feed on the social network so that a richer and more complete social feed including activities performed on the social network and/or third party websites may be presented to the user or the user's friends, family members or other acquaintances.

SUMMARY

According to one innovative aspect of the subject matter described in this disclosure, a system for providing third party modifications to a user history includes: a processor and a memory storing instructions that, when executed, cause the system to: transmit a first input specifying a type of user interactions to be shared; receive a set of second inputs associated with user interactions with a first service; determine which of the set of second inputs with the first service is of the specified type; and transmit a set of user activity data describing the user interactions with the first service that are of the specified type.

In general, another innovative aspect of the subject matter described in this disclosure may be embodied in methods that include: transmitting a first input specifying a type of user interactions to be shared; receiving a set of second inputs associated with user interactions with a first service; determining which of the set of second inputs with the first service is of the specified type; and transmitting a set of user activity data describing the user interactions with the first service that are of the specified type.

Other aspects include corresponding methods, systems, apparatus, and computer program products for these and other innovative aspects.

These and other implementations may each optionally include one or more of the following features. For instance, the features include: the user activity data is transmitted to a data management service; the first service is provided by a third party server; the type of user interactions is categorized by an action associated with the user activity data; the second set of inputs is encrypted; a private key is transmitted to the first service so that the second set of inputs can be encrypted; and the set of user activity data is stored in a social graph.

The present disclosure may be particularly advantageous in a number of respects. First, the system may allow a third party server to share user activity data with a data server so that a user history including user activities performed on a variety of different servers and/or devices can be provided to a user. Second, the system can provide a mechanism for the third party server to control data sharing with the data server. For example, the third party server may specify the types of user interactions to be shared with the data server so that other types of user interactions may not be shared with the data server. Third, the system may allow a user to control the data sharing and publication of the user activity data. For example, the user can select content from the user activity data to be published. In another example, the user may select not to publish the user activity data.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

Figure 1:
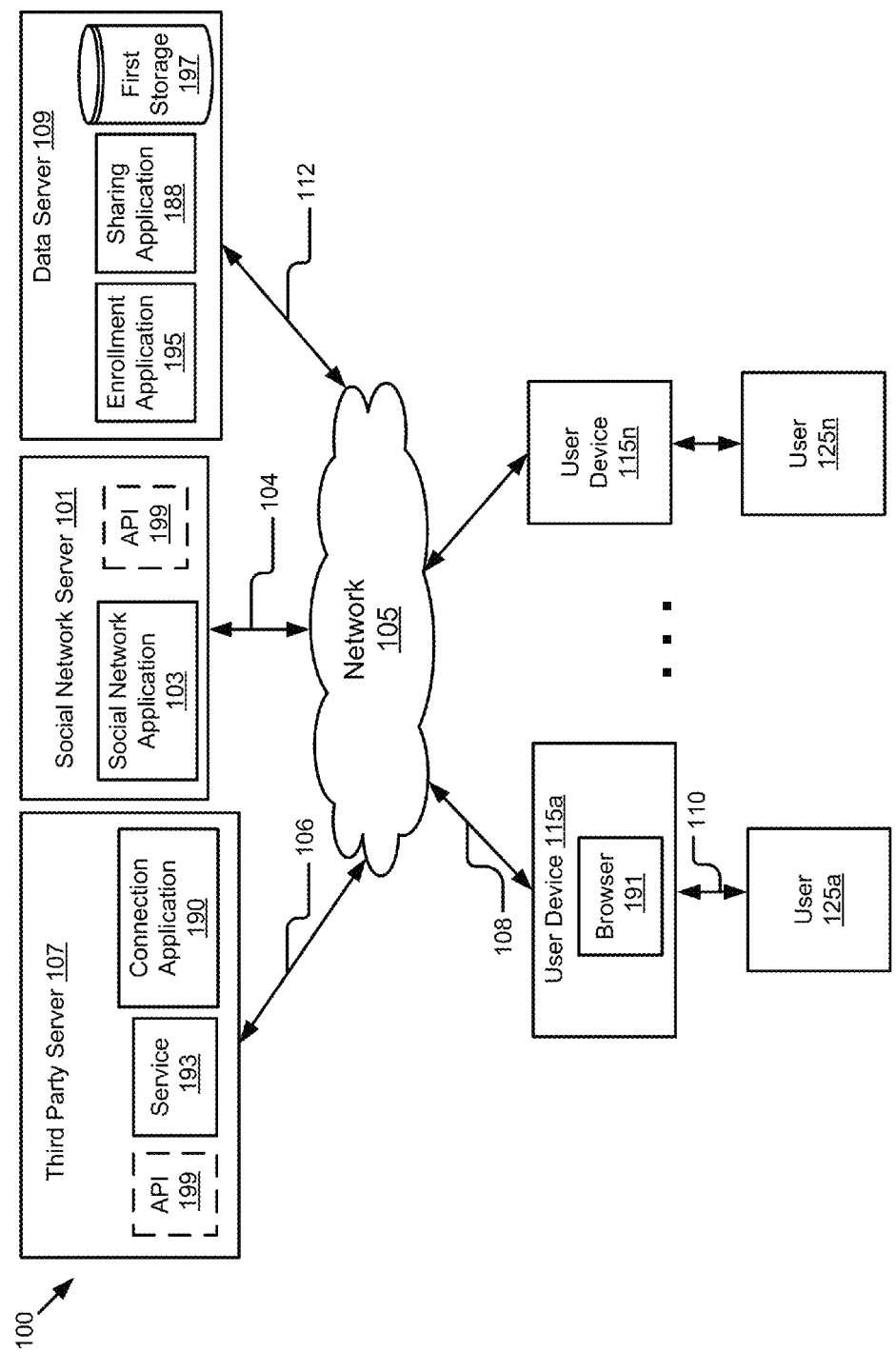
FIG. 1 is a block diagram illustrating an example system for providing third party modifications to a user history.

FIG. 1 illustrates a block diagram of some implementations of a system 100 for providing third party modifications to a user history. The illustrated system 100 includes user devices 115*a* . . . 115*n* (also referred to herein individually and collectively as 115) that are accessed by users 125*a* . . . 125*n* (also referred to herein individually and collectively as 125), a social network server 101, a data server 109, and a third party server 107. In the illustrated implementation, these entities of the system 100 are communicatively coupled via a network 105.

The user devices 115*a*, 115*n* in FIG. 1 are used by way of example. While FIG. 1 illustrates two user devices 115*a* and 115*n*, the present disclosure applies to a system architecture having one or more user devices 115. Furthermore, although FIG. 1 illustrates one network 105 coupled to the user devices 115, the social network server 101, the third party server 107, and the data server 109, in practice one or more networks 105 can be connected to these entities. Furthermore, while FIG. 1 includes one social network server 101, one third party server 107, and one data server 109, the architecture 100 could include one or more social network servers 101, one or more third party servers 107 and one or more data servers 109.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes BLUETOOTH® communication networks or a cellular communications network for sending and receiving data including via short messaging service (SMS), multimedia messaging service (MMS), hypertext transfer protocol (HTTP), direct data connection, WAP, email, etc.

The social network server 101 can be a hardware server that includes a processor, a memory and network communication capabilities. In the illustrated implementation, the social network server 101 is coupled to the network 105 via signal line 104. The social network server 101 sends and receives data to and from one or more of the user devices 115a, 115n, the third party server 107 and the data server 109 via the network 105. The social network server 101 includes a social network application 103. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they are related. Furthermore, it should be understood that the social network server 101 and the social network application 103 are representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating, and others may be of general interest or a specific focus. In some implementations, the social network includes a service that provides a social feed describing one or more activities of a user 125. For example, the social feed includes one or more status updates for the user 125 describing the user's actions, thoughts, opinions, etc. In some implementations the social network application 103 is stored and executed on one of the third party server 107 and the data server. In some implementations, the service provided by the social network application 103 is referred to as a "social network service." Other implementations are possible. In some implementations, the services and components of the third party server 107, social network server 101, and data server 109 can be provided by the same one or more servers. Moreover, the separation of various components and servers in the implementations described herein should not be understood as requiring such separation in all implementations, and it should be understood that the described components and servers can generally be integrated together in a single component or server.

In some implementations, the social network application 103 determines social content to be provided to a user 125 based at least in part on a user history. For example, the social network application 103 cooperates with the data server 109 to aggregate user activity into a user history. In some implementations, the user activity may include user interactions with a third party site. In some implementations, the user activity may occur in a social network. The social network application 103 may cooperate with the data server 109 to publish the user activity in a first user's 125 social feed to a social network service. Alternatively, the social network application 103 may cooperate with the data server 109 to provide the user activity into a private history for a first user 125. The social network application 103 then can determine which user activity in the history should be posted in a social feed for a second user 125 based at least in part upon an explicit request from the second user 125 or a determination that the second user 125 implicitly requests the content. In some implementations, all or part of these functionalities of social network application 103 may be alternatively implemented by the data server 109 which will be described below.

Many examples for determining social content to be provided to a user 125 based at least in part on a user history may be possible. For example, a first user 125 posted a review for a camera on a third party site or a social network. The social network application 103 cooperated with the data server 109 to aggregate the post into a history for the first user 125. For example, the social network application 103 published the post in a social feed. A second user 125 ignored the post since the second user 125 felt it was not relevant. However, after a few months, the second user 125 decided to buy a camera. For example, the second user 125 had a conversation with a friend in the social network mentioning this intent. Upon the second user's intent, the social network application 103 retrieves the post about the camera and publishes the post in the second user's 125 social feed.

In some implementations, the social network server 101 includes an optional application programming interface ("API") 199. The API 199 can include code and routines for handling data communication among different entities. For example, the optional API 199 can be stored in the social network server 101 includes code and routines for handling data communication between the social network server 101 and the data server 109. In the illustrated implementation, the API 199 is depicted using a dashed line to indicate that the API 199 may be an optional feature for the social network server 101.

The third party server 107 can be a hardware server that includes a processor, a memory and network communication capabilities. In the illustrated implementation, the third party server 107 is coupled to the network 105 via signal line 106. The third party server 107 sends and receives data to and from other entities of the system 100 via the network 105. The third party server 107 includes a service module 193, a connection application 190 and an optional API 199. The components of the third party server 107 are communicatively coupled to each other.

The API 199 is described above and the descriptions for the API 199 will not be repeated here. In some implementations, the optional API 199 can be stored in the third party server 107 and includes code and routines for handling data communication between the third party server 107 and the data server 109. For example, the API 199 can include an interface allowing the third party server 107 to transmit data to the data server 109.

The service module 193 can be code and routines for providing a service to a user. For example, the service module 193 includes code and routines for providing a web page with an embedded video to a user 125 and allowing the user 125 to interact with the web page and/or the video. Other examples of services provided by the service module 193 include, but not limited to, providing a news feed, publishing an article, generating a playlist, publishing a video, posting a picture or other online services. In some implementations, a user 125 interacts with a service provided by the service module 193. The service module 193 generates user activity data describing the user interaction with the service. For example, a user 125 comments on a news article presented on a web page provided by the service module 193, causing the service module 193 to generate user activity data describing that the user 125 has commented on the news article. The service module 193 sends the user activity data to the connection application 190. In some implementations, the service module 193 stores the user activity data in a second storage device 297 described below with respect to FIG. 2. In some implementations, the service module 193 can be stored and executed on one of the social network server 101 and the data server 109. The service provided by the service module 193 can be referred to as a "first service."

The connection application 190 can be code and routines for connecting the third party server 107 to the data server 109. In some implementations, the connection application 190 can be implemented using hardware including a field-programmable gate array ("FPGA") or an application-specific integrated circuit ("ASIC"). In some other instances, the connection application 190 can be implemented using a combination of hardware and software. In some implementations, the connection application 190 may be stored in a combination of the devices and servers, or in one of the devices or servers.

In some implementations, the connection application 190 aggregates user activity data associated with a user 125 and shares the user activity data with the data server 109 upon the consent of the user 125 and the service providing the user activity data (e.g., through the third party server 107). The user activity data can be data describing one or more user interactions with a service, e.g., provided by the third party server 107. For example, the user activity data includes data describing that a user 125 has viewed a video hosted by the third party server 107. In some implementations, the connection application 190 controls the data shared with the data server 109 by specifying one or more types of user interactions to be shared with the data server 109. For example, the connection application 190 specifies to share a view type of user interactions with the data server 109 and transmits user activity data associated with the view type to the data server 109. In one embodiment, an entity of the data server 109 (e.g., the enrollment application 195, the sharing application 188 or a combination of the enrollment application 195 and the sharing application) provides an input to the third party server 107 specifying one or more types of user interactions to be shared with the data server 109. The connection application 190 will be described below in more detail with reference to FIG. 2.

In some implementations, a type of user interactions may be categorized by an action associated with the user interactions. For example, a type of user interactions may be categorized by a verb describing an action in a user interaction. Examples of an action associated with a user interaction can include, but are not limited to, "view" (e.g., viewing a video on a site, viewing an online movie, etc.), "comment" (e.g., commenting on a post, commenting on a picture, etc.), "listen" (e.g., listening to a piece of music, listening to a radio station, etc.), "search" (e.g., searching for a product, searching for a news article, etc.), "read" (e.g., reading an article, reading a blog, etc.), "check in" (e.g., checking in a restaurant, checking in a coffee shop, etc.), and "post" (e.g., posting a picture on a site), etc. Examples of a type of user interactions may include, but are not limited to, a view type, a comment type, a listen type, a search type, a read type, a check-in type, and a post type, etc. Other types of user interactions may be possible. In some implementations, the connection application 190 can be stored and executed on one of the social network server 101 and the data server 109. The service provided by the connection application 190 can be referred to herein as the "connection service."

In some implementations, the connection application 190 provides metadata in addition to the user activity data to the data server 109. In some implementations, the metadata can include data describing additional information in association with the verbs describing actions in user interactions. For example, the metadata can include data describing an identity of a user 125 who performs the action, a date and a time of the action and a subject to which the user 125 performs the action. The connection application 190 provides the metadata to the data server 109 upon the consent of the user 125 and the service providing the metadata. In some implementations, the connection application 190 provides metadata in association with certain types of verbs to the data server 109. For example, the connection application 190 specifies to share metadata for a view type of user interactions with the data server 109 and transmits the metadata in association with the view type actions to the data server 109.

In some implementations, the connection application 190 generates and sends an indication to the data server 109 describing a user 125 interactions with a widget on a third party site, allowing the data server 109 to provide the user 125 an option to connect the user's 125 foreign and local accounts. In some implementations, a widget may be an embedded application providing a service. The service may be a social network service. For example, a user 125 visits a third party site and clicks a widget, e.g., a "share" button, an acknowledgement indication button, etc. The connection application 190 generates an indication describing the user 125 clicks the widget and sends the indication to the data server 109. Upon receiving the indication, the data server 109 controls the connection application 190 to generate interface data for providing a user interface that allows the user 125 to connect a foreign account to the local account of the user 125. For example, a foreign account may be a social account of the user 125 registered with the social network application 103. A local account may be an account of the user 125 registered with the third party server 107. In some implementations, the data server 109 generates the interface data and transmits the data to the connection application 190 for displaying the user interface on the user device 115 of the user 125. In some implementations, if the user 125 approves to connect the foreign account with the local account, the connection application 190 connects the foreign account with the local account of the user 125 and sends data describing the accounts connection for the user 125 to the data server 109 based at least in part on requirements of the third party server 107 and the data server 109. If the user 125 does not approve the connection, the connection application 190 does not connect the foreign account with the local account of the user 125.

The data server 109 can be a hardware server that includes a processor, a memory and network communication capabilities. In the illustrated implementation, the data server 109 is coupled to the network 105 via signal line 112. The data server 109 sends and receives data to and from other entities of the system 100 via the network 105. In some implementations, the data server 109 includes an enrollment application 195, a sharing application 188 and a first storage device 197. The components of the data server 109 are communicatively coupled to each other.

The enrollment application 195 can be code and routines for enrolling a third party server 107, or a service provided by the third party server 107 or another server (e.g., social network server 101) with the data server 109 and publishing user activity data for a user 125. The example implementation described discusses enrolling and sharing data between a third party server 107 with the social network server 101 through a data server 109. Other implementations are possible. In particular, in some implementations, the user activity data is shared from a service with the social network application 103. The service may be provided by a third party service, e.g., service 193 provided by the third party server 107; by the social network application 103; or another application or server, e.g., provided by another server (not shown). For example, the enrollment application 195 cooperates with the connection application 190 to register a third party server 107 with the data server 109, which allows the third party server 107 to share user activity data with the data server 109 and alternatively receive user information from the data server 109. In some implementations, the enrollment application 195 can be implemented using hardware including an FPGA or an ASIC. In some other instances, the enrollment application 195 can be implemented using a combination of hardware and software. In some implementations, the enrollment application 195 may be stored in a combination of the devices and servers, or in one of the devices or servers. In some implementations, at least part of the functionality described herein for the enrollment application 195 may be provided by the connection application 190. In some implementations, the enrollment application 195 is an entity of the social network server 101.

In some implementations, the enrollment application 195 receives user activity data associated with a user 125 from a third party server 107 enrolled with the data server 109. The enrollment application 195 publishes the user activity data upon the authorization of the user 125. For example, the enrollment application 195 receives an authorization signal to publish the user activity data from the user 125 and publishes the user activity data in response to receiving the authorization signal. In some implementations, the enrollment application 195 may not publish the user activity data if the user 125 does not authorize the publication of the user activity data.

In some implementations, the enrollment application 195 receives a user input describing a selection of content to be published from the user 125. The enrollment application 195 determines, based at least in part on the selection of content, a subset of user activity data to be published from the user activity data and publishes the subset of user activity data upon the authorization of the user 125. In some implementations, the subset of user activity data may include at least part of the user activity data. For example, if the selection of content indicates to publish user activity data associated with a "comment" type, the enrollment application 195 determines a subset of user activity data associated with the "comment" type and publishes the subset of user activity data upon the authorization of the user 125.

In some implementations, the enrollment application 195 receives a user input describing one or more social connections (e.g., friends, family, a public group, etc.) to publish the user activity data. The enrollment application 195 publishes the user activity data (or, a subset of user activity data) to the one or more social connections responsive to receiving the user input. In some implementations, the enrollment application 195 receives a user input indicating to publish the user activity data (or, a subset of user activity data) privately. The enrollment application 195 publishes the user activity data (or, the subset of user activity data) to a private history of the user 125 responsive to receiving the user input. A user history may include one or more user interactions performed by a user 125. A private history of a user 125 may be a user history published privately. For example, a private history of a user 125 includes a user history viewable to the user 125 but not accessible by other users 125.

The enrollment application 195 is described below in more detail with reference to FIGS. 3, 5, 6A, 6B, and 6C. In some implementations the enrollment application 195 can be stored and executed on one of the third party server 107 and the social network server 101. In some implementations, the service provided by the enrollment application 195 is referred to as the "data management service."

In the illustrated implementations, the data server 109 includes the sharing application 188. In some implementations, the sharing application 188 can be stored in the social network server 101.

The sharing application 188 can include code and routines for sharing user information between the social network server 101 and the third party server 107 via the data server 109. In some implementations, the sharing application 188 transmits information about a user 125 who interacts with the service 193 to the third party server 107 upon the consent of the user 125 and upon the connection of the third party server 107 to the data server 109 or the social network server 101. For example, a user 125 visits a third party site and clicks a widget, e.g., a "share" button, an acknowledgement indication button, etc. The sharing application 188 receives data describing the user activity from the third party server 107. The sharing application 188 provides information about the user 125 stored in the social graph to the third party server 107 based at least in part upon the user's 125 authorization.

In some implementations, the sharing application 188 determines whether the third party server 107 has enrolled with the data server 109 or the social network server 101. If the third party server 107 has enrolled with the data server 109 or the social network server 101, the sharing application 188 provides user information to the enrolled third party server 107. Otherwise, the sharing application 188 does not provide user information to the third party server 107. The sharing application 188 will be described below in more detail with reference to FIGS. 4, 7A and 7B. In some implementations, the sharing application 188 can be stored and executed on one of the data server 109 and the social network server 101.

In some implementations, the data server 109 also includes an engagement application (not pictured). In some implementations, the engagement application can include code and routines for determining social content to be provided to a user 125 based at least in part on a user history. As described above, the enrollment application 195 may cooperate with the social network application 103 to aggregate user activity into a user history. In some implementations, the user activity may include user interactions with a third party site. In some implementations, the user activity may occur in a social network. The enrollment application 195 may cooperate with the social network application 103 to publish the user activity in a first user's 125 social feed to a social network service. Alternatively, the enrollment application 195 may cooperate with the social network application 103 to provide the user activity into a private history for a first user 125. In some implementations, based at least in part on the user history, the engagement application can cooperate with the social network server 101 to determine which user activity in the history should be posted in a social feed for a second user 125 upon an explicit request from the second user 125 or a determination that the second user 125 implicitly requests the content.

Many examples for determining social content to be provided to a user 125 based at least in part on a user history may be possible. For example, a first user 125 posted a review for a camera on a third party site or a social network. The enrollment application 195 aggregated the post into a history for the first user 125. For example, the enrollment application 195 cooperated with the social network application 103 to publish the post in a social feed. A second user 125 ignored the post since the second user 125 felt it was not relevant. However, after a few months, the second user 125 decided to buy a camera. For example, the second user 125 had a conversation with a friend in the social network mentioning this intent. Upon the second user's intent, the engagement application retrieves the post about the camera and publishes the post in the second user's 125 social feed.

The first storage device 197 can be a non-transitory memory that stores data for providing the functionality described herein. The first storage 197 may be a dynamic random access memory (DRAM) device, a static random access memory (SRAM) device, flash memory or some other memory devices. In some implementations, the first storage 197 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the first storage 197 stores user activity data associated with one or more users 125. For example, the first storage 197 stores a user history including user activity data associated with a user 125. In some implementations, the user history includes description of one or more user interactions performed by the user 125 on the third party server 107 or the social network server 101. In some implementations, the user history may be a user history viewable to other users 125. In some other instances, the user history may be a private user history viewable to the user 125 privately and not accessible by other users 125. In some implementations, the enrollment application 195 may provide opt-in or out options and privacy settings.

The user device 115*a*, 115*n* may be a computing device that includes a memory and a processor, for example a laptop computer, a desktop computer, a tablet computer, a mobile telephone, a personal digital assistant ("PDA"), a mobile email device, a portable game player, a portable music player, a television with one or more processors embedded therein or coupled thereto, or other electronic device capable of accessing a network 105. In some implementations, the user device 115 includes a browser 191 for accessing online services. In the illustrated implementation, the user device 115*a* is communicatively coupled to the network 105 via signal line 108. The user 125*a* interacts with the user device 115*a* via signal line 110. The user device 115*n* is communicatively coupled to the network 105. The user 125*n* also interacts with the user device 115*n*. In some implementations, the connection application 190 acts in part as a thin-client application that may be stored on the user device 115*a*, 115*n* and in part as components that may be stored on one or more of the social network server 101, the third-party server 107 and the data server 109.

In some implementations, a user 125 logs in one or more of the social network server 101, the third party server 107 and the data server 109 using a universal login account. In some instances, a user 125 logs in to each of the social network server 101, the third party server 107, and the data server 109 using an individual login account.

Figure 2:
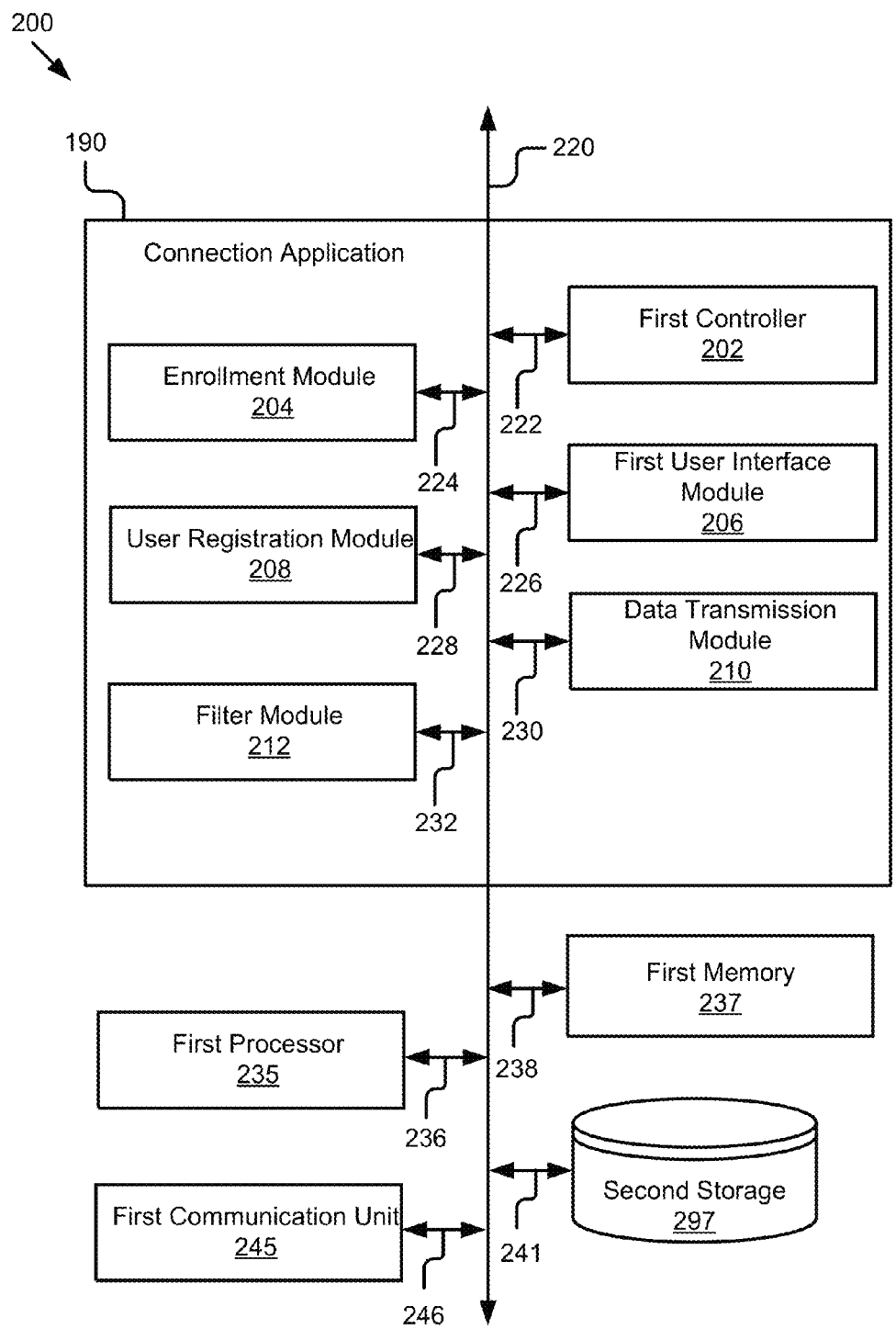
FIG. 2 is a block diagram illustrating an example of a connection application.

Referring now to FIG. 2, an example of the connection application 190 is shown in more detail. FIG. 2 is a block diagram of a computing device 200 that includes a connection application 190, a first processor 235, a first memory 237, a second communication unit 245, and a storage device 197 according to some examples. The components of the computing device 200 are communicatively coupled by a bus 220. In some implementations, the computing device 200 can be one of a social network server 101, a user device 115, a third party server 107, and a data server 109.

The first processor 235 includes an arithmetic logic unit, a microprocessor, a general purpose controller, or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays, and physical configurations are possible.

The first memory 237 stores instructions and/or data that may be executed by the processor 235. The memory 237 is coupled to the bus 220 for communication with the other components via signal line 238. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The first communication unit 245 transmits and receives data to and from at least one of the user device 115, the third-party server 107, the data server 109, and the social network server 101 depending upon where the connection application 190 may be stored. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the user device 115. In some implementations, the communication unit 245 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files and/or media objects using standard network protocols including TCP/IP, HTTP, HTTPS and SMTP, etc.

The second storage device 297 can be a non-transitory memory that stores data for providing the functionality described herein. The second storage device 297 may be a dynamic random access memory (DRAM) device, a static random access memory (SRAM) device, flash memory, or some other memory device. In some implementations, the second storage device 297 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the second storage device 297 is communicatively coupled to the bus 220 via signal line 241.

In the illustrated implementation shown in FIG. 2, the connection application 190 includes a first controller 202, an enrollment module 204, a first user interface module 206, a user registration module 208, a data transmission module 210, and a filter module 212. These components of the connection application 190 are communicatively coupled to each other via the bus 220.

The first controller 202 can be software including routines for handling communications between the connection application 190 and other components of the computing device 200. In some implementations, the controller 202 can be a set of instructions executable by the processor 235 to provide the functionality described below for handling communications between the connection application 190 and other components of the computing device 200. In some instances, the controller 202 can be stored in the memory 237 of the computing device 200 and can be accessible and executable by the processor 235. The controller 202 may be adapted for cooperation and communication with the processor 235 and other components of the computing device 200 via signal line 222.

The first controller 202 sends and receives data, via the communication unit 245, to and from one or more of a user device 115, a social network server 101, a third party server 107 and a data server 109. In some instances, the first controller 202 receives, via the communication unit 245, a registration request for registering a user 125 with a service provided by the third party server 107 from a user device 115 and sends the registration request to the user registration module 208. In some instances, the first controller 202 receives user activity data from the data transmission module 210 and sends, via the communication unit 245, the user activity data to the data server 109. In some instances, the first controller 202 receives graphical data for providing a user interface from the user interface module 206 and sends the graphical data to a user device 115, causing the user device 115 to present the user interface to a user 125.

In some implementations, the first controller 202 receives data from components of the connection application 190 and stores the data in the second storage device 297. For example, the first controller 202 receives data describing one or more privacy settings from the user registration module 208 and stores the data in the second storage device 297. In some implementations, the first controller 202 retrieves data from the second storage device 297 and sends the data to components of the connection application 190. For example, the first controller 202 retrieves data describing one or more types of user interactions specified by the third party server 107 from the second storage device 297 and sends the data to the filter module 212.

The enrollment module 204 can be software including routines for enrolling a third party server 107 with a data server 109. In some implementations, the enrollment module 204 can be a set of instructions executable by the processor 235 to provide the functionality described below for enrolling a third party server 107 with a data server 109. In some instances, the enrollment module 204 can be stored in the memory 237 of the computing device 200 and can be accessible and executable by the processor 235. The enrollment module 204 may be adapted for cooperation and communication with the processor 235 and other components of the computing device 200 via signal line 224.

In some implementations, the enrollment module 204 cooperates with the enrollment application 195 to enroll a third party server 107 with a data server 109, which allows the third party server 107 to share user activity data with the data server 109. For example, the enrollment module 204 of the connection application 190 sends an enrollment request to the enrollment application 195, causing the enrollment application 195 to send data describing one or more requirements specified by the data server 109 to the enrollment module 204. The requirements can include, for example, data specifying one or more types of user interactions to be shared with the data server 109. For example, the data requirements indicate that the data server 109 is only interested in receiving activity data describing certain types of user interactions with the service 193 (e.g., whether the user 125 views videos, whether the user 125 comments on an article, etc.). The enrollment module 204 presents the one or more requirements to an administrator of the third party server 107. If the administrator of the third party server 107 provides an input indicating that the administrator agrees with the requirements, the enrollment module 204 sends a signal indicating an acceptance of the requirements to the enrollment application 195, causing the enrollment application 195 to enroll the third party server 107 with the data server 109 for sharing user activity data with the data server 109. If the administrator disagrees with the requirements, the enrollment module 204 sends a signal indicating a decline of the requirements to the enrollment application 195 and the third party server 107 may not be enrolled with the data server 109.

In some implementations, the enrollment module 204 specifies one or more types of user interactions to be shared with the data server 109 during the enrollment process. For example, the enrollment module 204 specifies a view type and a comment type of user interactions to be shared with the data server 109. As a result, user activity data associated with the view type and the comment type may be transmitted to the data server 109 upon the consent of a user 125 associated with the user activity data. The enrollment module 204 stores the one or more types of user interactions specified by the third party server 107 in the second storage device 297.

As described above with respect to requirements transmitted to the third party server 107, in some implementations the enrollment module 204 of the connection application 190 receives an input indicating one or more types of user interactions with the service 193 to be shared with the data server 109. The enrollment module 204 works with the other entities of the connection application 190 to aggregate data that is of the specified type for sharing with the data server 109.

The user registration module 208 can be software including routines for registering a user 125 with a third party server 107. In some implementations, the user registration module 208 can be a set of instructions executable by the processor 235 to provide the functionality described below for registering a user 125 with a third party server 107. In some instances, the user registration module 208 can be stored in the memory 237 of the computing device 200 and can be accessible and executable by the processor 235. The user registration module 208 may be adapted for cooperation and communication with the processor 235 and other components of the computing device 200 via signal line 228.

In some implementations, the user registration module 208 receives a registration request from a user 125 and instructs the user interface module 206 to generate graphical data for providing a registration form to the user 125. The user interface module 206 sends the graphical data to a user device 115, causing the user device 115 to present the registration form to the user 125. The user 125 fills out the registration form and sends the registration form to the user registration module 208, causing the user registration module 208 to register the user 125 with a service provided by the third party server 107.

In some implementations, the user registration module 208 receives an opt-in input from a user 125 during the registration process. In some implementations, the user registration module 208 receives an opt-out input from a user 125 indicating that the user 125 opts out the data sharing between the third party server 107 and the data server 109.

In some implementations, the user registration module 208 receives data describing one or more privacy settings from the user 125 during the registration process. In some instances, the user registration module 208 receives data describing one or more types of user interactions that the user 125 selects to share with the data server 109. In some instances, the user registration module 208 receives data describing a privacy level with a social network application 103 from the user 125. The privacy level indicates, for example, one or more social connections (e.g., friends, coworkers, etc.) to which the user 125 selects to publish his or her activity data in the social network. In some implementations, the user 125 may also configure the privacy settings for the data sharing via the enrollment application 195. For example, the enrollment application 195 instructs the user interface module 206 to provide a user interface to the user 125, allowing the user 125 to configure the privacy settings via the user interface. The enrollment application 195 receives the privacy settings from the user 125 via the user interface and stores the privacy settings in the first storage 197, the second storage 297 or a combination of the first storage 197 and the second storage 297.

The filter module 212 can be software including routines for filtering user activity data. In some implementations, the filter module 212 can be a set of instructions executable by the processor 235 to provide the functionality described below for filtering user activity data. In some instances, the filter module 212 can be stored in the memory 237 of the computing device 200 and can be accessible and executable by the processor 235. The filter module 212 may be adapted for cooperation and communication with the processor 235 and other components of the computing device 200 via signal line 232.

In some implementations, the filter module 212 receives, via the first controller 202, user activity data describing a user interaction with a service from the service module 193. The filter module 212 determines whether the user activity data (or, the user interaction) can be of a type of user interactions specified by the third party server 107. For example, if a type of user interactions specified by the enrollment module 204 described above includes a view type, the filter module 212 determines whether the user activity data can be categorized to the view type. For example, if the user activity data includes a "view" action, the filter module 212 determines that the user activity data may be of the view type specified by the third party server 107.

If the user activity data can be categorized to the type of user interactions specified by the third party server 107, the filter module 212 sends the user activity data to the data transmission module 210, causing the data transmission module 210 to send the user activity data to the data server 109. In some implementations, the filter module 212 further determines whether the user 125 authorizes to share the user activity data with the data server 109. If the user 125 has authorized the data sharing, the filter module 212 sends the user activity data to the data transmission module 210 for delivering the user activity data to the data server 109. If the user 125 has not authorized the data sharing, the filter module 212 does not send the user activity data to the data transmission module 210 and the user activity data may not be delivered to the data server 109.

However, if the user activity data cannot be categorized to the type of user interactions specified by the third party server 107, the filter module 212 does not send the user activity data to the data transmission module 210 and the user activity data may not be transmitted to the data server 109.

In some implementations, the filter module 212 determines metadata in addition to the user activity data. In some implementations, the metadata can include data describing additional information in association with the verbs describing actions in user interactions with the service 193. Examples for the additional information in association with the verbs includes, but not limited to, an identity of a user 125 who performs the action, a date and a time of the action and a subject to which the user 125 performs the action. Other examples are possible. In some implementations, the filter module 212 receives the metadata from the service module 193. In some implementations, the filter module 212 generates the metadata describing the additional information associated with the verbs and adds the metadata to the user activity data. The filter module 212 transmits the metadata along with the user activity data to the data transmission module 210 for the transmission of the data to the data server 109. In some implementations, the filter module 212 determines metadata in association with certain types of verbs describing user interactions. For example, the filter module 212 determines metadata for a view type of user interactions and transmits the metadata in association with the view type actions to the data transmission module 210.

The first user interface module 206 can be software including routines for generating graphical data for providing user interfaces. In some implementations, the user interface module 206 can be a set of instructions executable by the processor 235 to provide the functionality described below for generating graphical data for providing user interfaces. In some instances, the user interface module 206 can be stored in the memory 237 of the computing device 200 and can be accessible and executable by the processor 235. The user interface module 206 may be adapted for cooperation and communication with the processor 235 and other components of the computing device 200 via signal line 226.

In some implementations, the first user interface module 206 generates graphical data for providing a user interface that depicts a registration form. The user interface module 206 sends the graphical data to a user device 115 operated by a user 125, causing the user device 115 to present the registration form to the user 125 via the user interface. In some implementations, the user interface module 206 generates graphical data for providing a user interface that depicts one or more privacy settings. The user interface module 206 sends the graphical data to a user device 115, causing the user device 115 to present the user interface to the user 125. The user 125 may configure the privacy settings via the user interface. For example, the user 125 specifies a privacy level with a social network application 103 via the user interface.

In some implementations, the user interface module 206 generates graphical data for providing a user interface that allows a user 125 to configure the publication of the user activity data. For example, the user interface allows a user 125 to select a subset of user activity data to be published, one or more social connections to which the subset of user activity data may be published, or whether to publish the subset of user activity data privately in the private history of the user 125 or in the social network to other users 125 that are approved by the user 125, etc. In some implementations, the user interface module 206 may generate graphical data for providing other user interfaces to users 125.

In some implementations, the user interface module 206 determines user interface data for displaying a user interface that allows a user 125 who interacts with a widget on a third party site to connect a foreign account to a local account of the user 125. For example, the user interface module 206 receives a control signal from the data server 109 for providing a user interface to a user 125 who clicks a widget on a third party site. For example, the user interface allows the user 125 to select if the user 125 likes to connect a foreign account (e.g., a social account with the social network application 103) to a local account (e.g., an account with the third party server 107).

If the user 125 selects to connect the social account with the third party account, the first controller 202 receives the user's 125 selection as well as social account login information from the user 125 and sends the information to the user registration module 208 for connecting the user's 125 third party account with the social account. In some implementations, the first controller 202 also sends a signal indicating the account connection for the user 125 to the data server 109. If the user 125 does not agree with accounts connection, the first controller 202 does not control the user registration module 208 to connect accounts for the user 125, nor does the first controller 202 sends the connection signal to the data server 109.

The data transmission module 210 can be software including routines for transmitting user activity data to the data server 109. In some implementations, the data transmission module 210 can be a set of instructions executable by the processor 235 to provide the functionality described below for transmitting user activity data to the data server 109. In some instances, the data transmission module 210 can be stored in the memory 237 of the computing device 200 and can be accessible and executable by the processor 235. The data transmission module 210 may be adapted for cooperation and communication with the processor 235 and other components of the computing device 200 via signal line 230.

In some implementations, the data transmission module 210 receives user activity data from the filter module 212. The data transmission module 210 transmits the user activity data to the data server 109 via the first controller 202 and the first communication unit 245.

Figure 3:
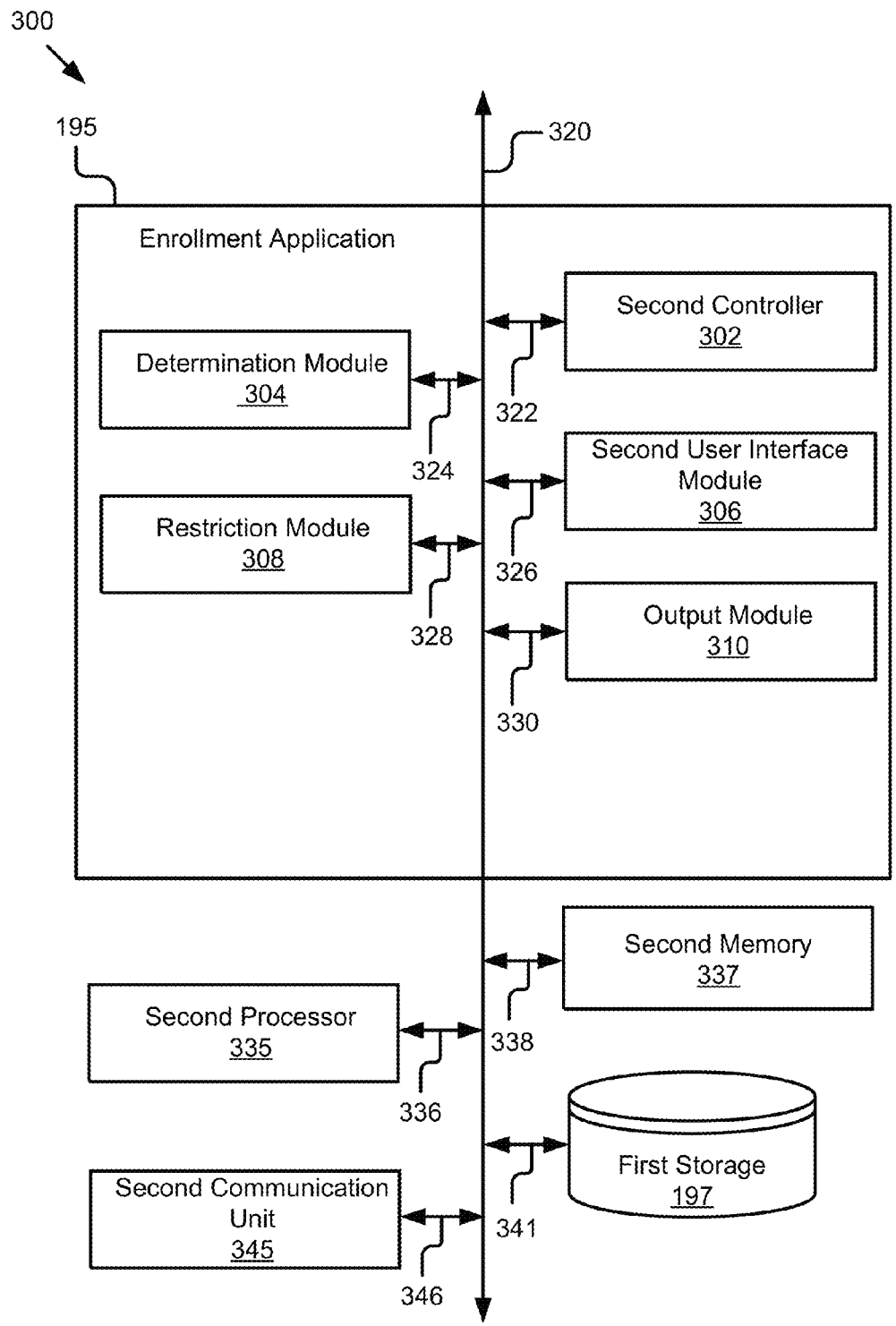
FIG. 3 is a block diagram illustrating an example of an enrollment application.

Referring now to FIG. 3, an example of the enrollment application 195 is shown in more detail. FIG. 3 is a block diagram of a computing device 300 that includes a second communication unit 345, a second processor 335, a second memory 337 and a first storage device 197 according to some examples. The components of the computing device 300 are communicatively coupled by a bus 320. In some implementations, the computing device 300 can be one of a social network server 101, a user device 115, a third party server 107 and a data server 109.

The second communication unit 345, second processor 335 and second memory 337 provide similar functionality as described above for the first communication unit 245, the first processor 235 and the first memory 237, respectively. Accordingly, these descriptions will not be repeated here. In the illustrated implementation, the second communication unit 345 is communicatively coupled to the bus 320 via signal line 346, the second processor 335 is communicatively coupled to the bus 320 via signal line 336 and the second memory is communicatively coupled to the bus 320 via signal line 338. The first storage 197 is described above with reference to FIG. 1, and the description will not be repeated here. In the illustrated implementation, the first storage 197 is communicatively coupled to the bus 320 via signal line 341.

In the illustrated implementation shown in FIG. 3, the enrollment application 195 includes a second controller 302, a determination module 304, a second user interface module 306, a restriction module 308, and an output module 310. These components of the enrollment application 195 are communicatively coupled to each other via the bus 320.

The second controller 302 can be software including routines for handling communications between the enrollment application 195 and other components of the computing device 300. In some implementations, the second controller 302 can be a set of instructions executable by the second processor 335 to provide the functionality described below for handling communications between the enrollment application 195 and other components of the computing device 300. In some instances, the second controller 302 can be stored in the second memory 337 of the computing device 300 and can be accessible and executable by the second processor 335. The second controller 302 may be adapted for cooperation and communication with the second processor 335 and other components of the computing device 300 via signal line 322.

The second controller 302 sends and receives data, via the communication unit 345, to and from one or more of a user device 115, a social network server 101, a third party server 107 and a data server 109. In some instances, the second controller 302 receives, via the second communication unit 345, an input specifying one or more types of user interactions to be transmitted to the data server 109 from the third party server 107. In some instances, the second controller 302 receives, via the second communication unit 345, an indication that a user 125 has registered with a service provided by the third party server 107. In some instances, the second controller 302 receives, via the second communication unit 345, user activity data describing user interactions with a service provided by the third party server 107 that is of the specified type from the third party server 107. In some instances, the second controller 302 receives, via the second communication unit 345, an input specifying content approved by a user 125 to be provided to a user device 115 from the third party server 107.

In some implementations, the second controller 302 receives data from other components of the enrollment application 195 and stores the data in the first storage 197.

In some implementations, the second controller 302 transmits to the third party server 107 a requirements input that describes one or more types of user activity data to the shared with the data server 109. In some implementations, the requirements input is determined based on an input provided by an administrator of the data server 109, an input provided by the user 125 or a combination of an input provided by the administrator of the data server 109 and an input provided by the user 125. In some implementations, the second controller 302 transmits the user activity data to the social network application 103.

The determination module 304 can be software including routines for determining whether a user 125 has approved of content. In some implementations the determination module 304 can be a set of instructions executable by the second processor 335 to provide the functionality described below for determining whether a user 125 has approved of content. In some instances, the determination module 304 can be stored in the second memory 337 of the computing device 300 and can be accessible and executable by the second processor 335. The determination module 304 may be adapted for cooperation and communication with the second processor 335 and other components of the computing device 300 via signal line 324.

In some implementations, the determination module 304 receives, via the second controller 302, user activity data describing a user interaction with a service provided by the third party server 107 (e.g., service 193). The determination module 304 determines whether the user activity data has been approved by a user 125 to be provided to a user device 115. For example, if an input from a user 125 specifying content approved by the user 125 indicates that the user 125 has approved the user activity data, the determination module 304 determines that the user activity data has been approved by the user 125 and delivers the user activity data to the restriction module 308 for further processing regarding the approved user activity data. If the input indicates that the user 125 has not approved the user activity data, the determination module 304 does not send the user activity data to the restriction module 308 and the user activity data may not be provided to the user device 115 operated by the user 125.

The second user interface module 306 can be software including routines for generating graphical data for providing a graphical user interface to the user device 115. In some implementations the second user interface module 306 can be a set of instructions executable by the processor 335 to generate graphical data for providing the user interfaces described below with reference to FIGS. 8 and 9. The user interface module 306 sends the graphical data to a user device 115, causing the user device 115 to present the graphical user interface to the user 125. The user 125 provides inputs to the graphical user interface using the user device 115, thereby providing the inputs necessary for the determination module 304 to perform its function. In some implementations, the user interface module 306 can be a set of instructions executable by the processor 335 to provide the functionality described above for generating graphical data for providing user interfaces. In some instances, the user interface module 306 can be stored in the memory 337 of the computing device 300 and can be accessible and executable by the processor 335. The user interface module 306 may be adapted for cooperation and communication with the processor 335 and other components of the computing device 300 via signal line 326.

The restriction module 308 can be software including routines for determining whether the user activity data is restricted. The functionality of the restriction module 308 is described in more detail with reference to FIG. 6C. The restriction module 308 may be adapted for cooperation and communication with the processor 335 and other components of the computing device 300 via signal line 328.

In some implementations, the restriction module 308 determines a type of the interaction described by the approved user activity data. For example, the restriction module 308 receives, via the second controller 302, an input specifying a type of a user interaction associated with the user activity data. The restriction module 308 determines whether the type of the user interaction is a user specified type, e.g., a "view" type. If the type of the user interaction cannot be categorized to the "view" type, the restriction module 308 sends the user activity data to the output module 310 for providing the approved user activity data to a public social feed to the user device 115. Accordingly, in some embodiments the user activity data is restricted if it relates to a view type since the user 125 may want to keep this information confidential. For example, the user 125 may not want other users 125 to know what videos they are watching. If the type of the user interaction can be categorized to the "view" type, the restriction module 308 applies additional restrictions to the approved user activity data. If the user activity data is not restricted then the restriction module 308 may send the content describing the approved action to the output module 310 for providing the content to a public user social feed on a social network service. If the user activity data is restricted then the restriction module 308 instructs the output module 310 to provide the approved action to a private history of the user 125 not accessible to other users 125.

The output module 310 can be software including routines for providing user approved activity data to the user 125. In some implementations, the output module 310 can be a set of instructions executable by the processor 335 to provide the functionality described below for transmitting approved user activity data to the social network application 103. In some instances, the output module 310 can be stored in the memory 337 of the computing device 300 and can be accessible and executable by the processor 335. The output module 310 may be adapted for cooperation and communication with the processor 335 and other components of the computing device 300 via signal line 330.

In some implementations, the output module 310 sends approved user activity data to a user social feed on a social network service provided by the social network application 109. In some implementations, the output module 310 provides approved user activity to a private history of the user 125 not accessible to other users 125.

Figure 4:
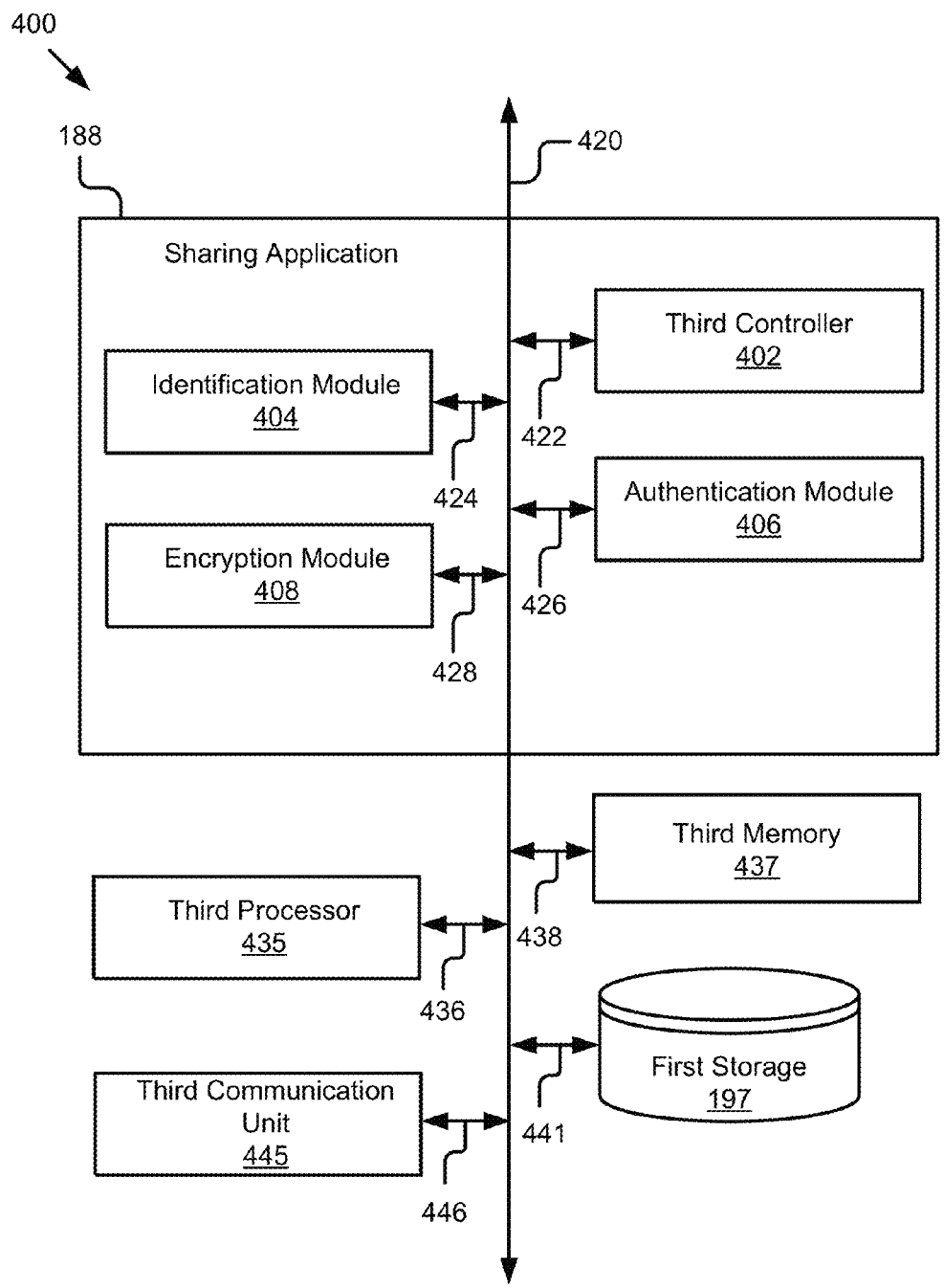
FIG. 4 is a block diagram illustrating an example of a sharing application.

Referring now to FIG. 4, an example of the sharing application 188 is shown in more detail. FIG. 4 is a block diagram of a computing device 400 that includes a third communication unit 345, a third processor 335, a third memory 337 and a first storage device 197 according to some examples. The components of the computing device 400 are communicatively coupled by a bus 420. In some implementations, the computing device 400 can be one of a social network server 101, a user device 115, a third party server 107 and a data server 109.

The third communication unit 445, third processor 435 and third memory 437 provide similar functionality as described above for the first communication unit 245, the first processor 235 and the first memory 237, respectively. Accordingly, these descriptions will not be repeated here. In the illustrated implementation, the third communication unit 445 is communicatively coupled to the bus 420 via signal line 446, the third processor 435 is communicatively coupled to the bus 420 via signal line 436 and the third memory is communicatively coupled to the bus 420 via signal line 438. The first storage 197 is described above with reference to FIG. 1, and the description will not be repeated here. In the illustrated implementation, the first storage 197 is communicatively coupled to the bus 420 via signal line 441.

In the illustrated implementation shown in FIG. 4, the sharing application 188 includes a third controller 402, an identification module 404, an authentication module 406 and an encryption module 408. These components of the sharing application 188 are communicatively coupled to each other via the bus 420.

The third controller 402 can be software including routines for handling communications between the sharing application 188 and other components of the computing device 400. In some implementations, the third controller 402 can be a set of instructions executable by the third processor 435 to provide the functionality described below for handling communications between the sharing application 188 and other components of the computing device 400. In some instances, the third controller 402 can be stored in the third memory 437 of the computing device 400 and can be accessible and executable by the third processor 435. The third controller 402 may be adapted for cooperation and communication with the third processor 435 and other components of the computing device 400 via signal line 422.

The third controller 402 sends and receives data, via the communication unit 445, to and from one or more of a user device 115, a social network server 101, a third party server 107 and a data server 109. In some instances, the third controller 402 receives, via the communication unit 445, an indication that a user 125 interacted with a widget on a third part site from the third party server 107. In some instances, the third controller 402 receives, via the communication unit 445, an input identifying the third party server 107. In some instances, the third controller 402 receives, via the communication unit 445, a user authorization signal from the social network server 101 and sends information about a user 125, via the communication unit 445, to the third party server 107 upon receiving the user authorization signal.

In some implementations, the third controller 402 receives data from the components of the sharing application 188 and stores the data in the first storage 197.

The identification module 404 can be software including routines for identifying a third party server 107 and determining whether the third party server 107 has been enrolled with the data server 109. In some implementations, the identification module 404 can be a set of instructions executable by the third processor 435 to provide the functionality described below for identifying a third party server 107 and determining whether the third party server 107 has been enrolled with the data server 109. In some instances, the identification module 404 can be stored in the third memory 437 of the computing device 400 and can be accessible and executable by the third processor 435. The identification module 404 may be adapted for cooperation and communication with the third processor 435 and other components of the computing device 400 via signal line 424.

In some implementations, the identification module 404 receives, via the third controller 402, an input that identifies a third party server 107. The identification module 404 determines whether the third party server 107 has been enrolled with the data server 109 based at least in part on identity information of the third party server 107 specified by the input (e.g., an identity code, a unique registration number, etc.). An enrollment process for enrolling a third party server 107 with the data server 109 has been described above with reference to FIG. 2. For example, as described above, the enrollment module 204 cooperates with the enrollment application 195 to enroll a third party server 107 with a data server 109 upon an acceptance of requirements specified by an administrator of the third party server 107. In some implementations, the identification module 404 determines that the third party server 107 has been enrolled with the data server 109 and sends an enrollment signal indicating the enrollment of the third party server 107 to the authentication module 406 for further processing. If the identification module 404 determines that the third party server 107 has not been enrolled with the data server 109, the identification module 404 does not provide user information to the third party server 107.

The authentication module 406 can be software including routines for determining whether a user 125 permits to share user information. In some implementations, the authentication module 406 can be a set of instructions executable by the third processor 435 to provide the functionality described below for determining whether a user 125 permits to share user information. In some instances, the authentication module 406 can be stored in the third memory 437 of the computing device 400 and can be accessible and executable by the third processor 435. The authentication module 406 may be adapted for cooperation and communication with the third processor 435 and other components of the computing device 400 via signal line 426.

In some implementations, the authentication module 406 receives, via the third controller 402, an indication that a user 125 interacted with a widget on a third party site from the third party server 107. For example, the user 125 logs in to a third party site and clicks on a "share" button for sharing an article provided by the third party site to the user's 125 social content in a social network service. The third party server 107 specifies an identity of the user 125 based at least in part on login information of the user 125 and sends an indication describing the user interaction as well as the identity of the user 125 to the data server 109. The authentication module 406 determines the identity of the user 125 based at least in part on the indication from the third party server 107.

In some implementations, the authentication module 406 determines whether the user 125 permits to share the user's 125 information stored in the social graph to an enrolled third party server 107. If the user 125 permits the data server 109 to share user information with the enrolled third party server 107, the authentication module 406 sends an authorization signal indicating the authorization of the user 125 to the encryption module 408 for providing user information to the enrolled third party server 107. If the user 125 declines to share information with the third party server 107, the authentication module 406 does not provide information of the user 125 to the third party server 107.

The encryption module 408 can be software including routines for encrypting the user information. In some implementations, the encryption module 408 can be a set of instructions executable by the third processor 435 to provide the functionality described below for encrypting the user information. In some instances, the encryption module 408 can be stored in the third memory 437 of the computing device 400 and can be accessible and executable by the third processor 435. The encryption module 408 may be adapted for cooperation and communication with the third processor 435 and other components of the computing device 400 via signal line 428.

In some implementations, the encryption module 408 receives, via the third controller 402, an enrollment signal and an authorization signal from the identification module 404 and the authentication module 406 respectively. Responsive to receiving these two signals the encryption module 408 retrieves information of the user 125 from the social graph and encrypts the information. For example, the encryption module 408 applies encryption techniques to encode the information and sends, via the third controller 402, the encoded information and optionally a private key to the third party server 107, allowing a secured transmission and preventing the third party server 107 to further spread the user information to other unauthorized third party servers 107.

Figure 5:
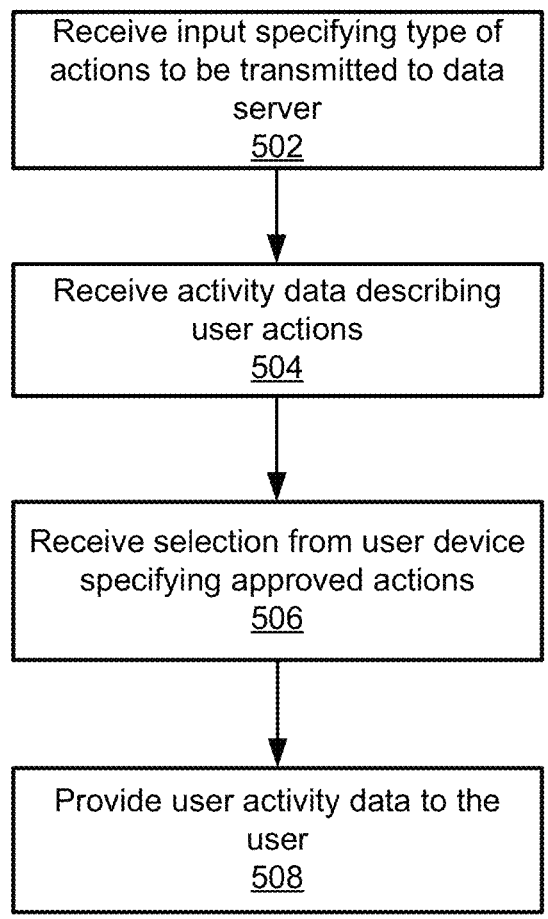
FIG. 5 is a flowchart of an example method for providing third party modifications to a user history.

Referring now to FIG. 5, an example of a method 500 for providing third party modifications to a user history is described. In the illustrated implementation, the method 500 can include receiving 502 an input specifying one or more types of actions to be transmitted to the enrollment application 195 included in the data server 109. For example, the connection service provided by the connection application 190 communicates with the enrollment application 195 to provide an input specifying one or more types of activities to be reported to the data management service provided by the enrollment application 195. The enrollment application 195 receives 502 the input. The method 500 can also include receiving 504 activity data describing user actions from the connection application 190. The method 500 can include receiving 506 a selection from the user device 115 specifying actions described by activity data that can be provided to the user 125. The method 500 may continue by providing 508 the activity data describing the specified actions to the user 125.

Figure 6A:
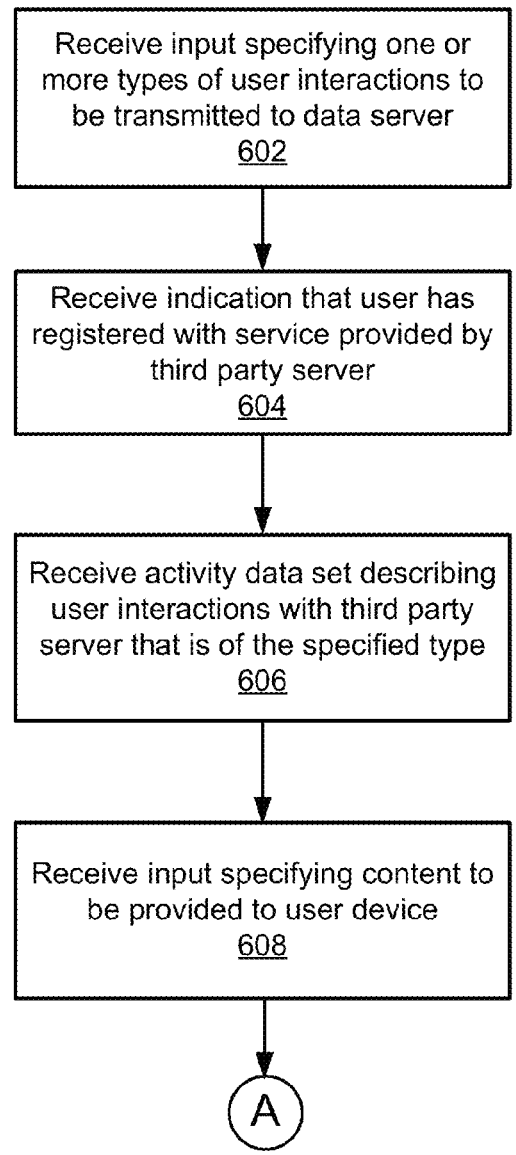
FIGS. 6A-6C are flowcharts of another example method for providing third party modifications to a user history.
Figure 6B:
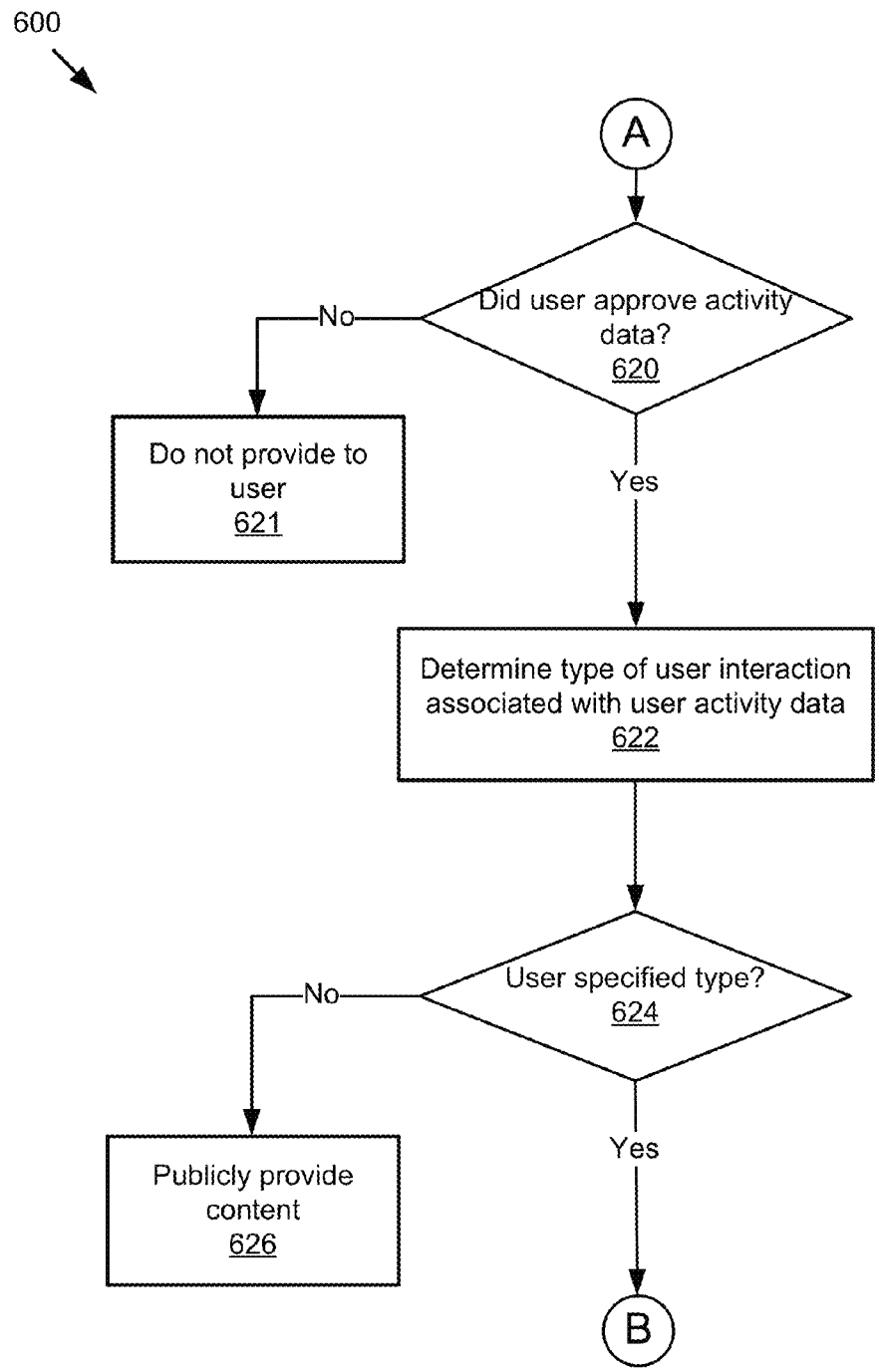
Figure 6C:
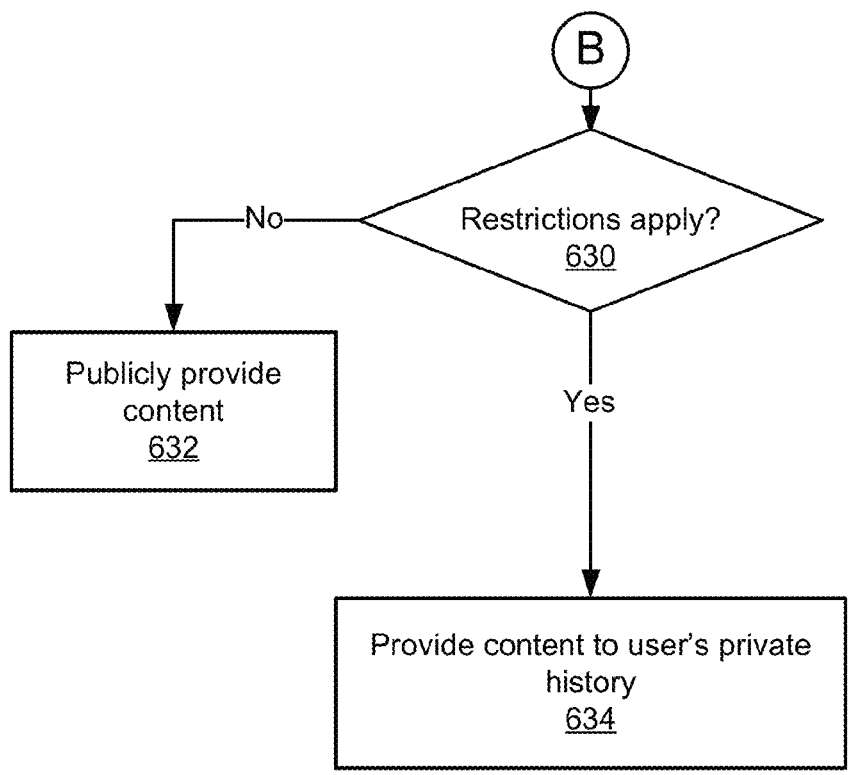

Referring now to FIGS. 6A-6C, another example of a method 600 for providing third party modifications to a user history is described. Turning to FIG. 6A, the method 600 can include receiving 602 an input generated by the third party server 107. The input specifies one or more types of actions to be transmitted to the enrollment application 195 included in the data server 109. For example, the input specifies that the "view" actions associated with a user 125 viewing a video will be transmitted to the enrollment application 195. In some implementations, the input received by the enrollment application 195 at step 602 can be generated by the user device 115. For example, the user 125 uses the user device 115 to specify the types of actions that the enrollment application 195 will receive information about. In some instances, the input received at step 602 can be generated by a combination of one or more of the third party server 107 (e.g., the connection application 190), the social network server 101, the enrollment application 195 and the user device 115.

The method 600 can also include receiving 604 an indication that the user 125 has registered with the connection application 190 provided by the third party server 107. For example, the third party server 107 transmits registration data to the enrollment application 195 and the registration data includes an indication that the user 125 has registered with the service provided by the third party server 107. The method 600 can include receiving 606 an activity data set describing user interactions with third party server 107 performed by one or more registered users 125 that is of the type specified at step 602. The activity data set may include activity data describing the actions of one or more registered users 125 with the first service 193. In some implementations, receiving 606 an activity data set describing user interactions with third party server 107 can be repeated two or more times so that the enrollment application 195 receives multiple sets of activity data from the third party server 107 describing the actions of one or more registered users 125.

The method 600 can also include receiving 608 an input from the user device 115 specifying which content from the activity data set received at step 606 is approved by the user 125 to be provided to the user device 115. For example, the approved actions can be included in social feed associated with the user 125 on the social network application 103. The user 125 may select content including a subset of activity data from the activity data received from the third party server 107 at step 606. The selected content may then be included in the social feed for the user 125 as provided by the social network application 103.

Referring to FIG. 6B, the method 600 can include determining 620 whether the user 125 has approved actions described by the activity data. If the user 125 has not approved an action, the method 600 may continue by not providing 621 this action to the social network service or the user 125. If the user 125 has approved the action, the method 600 may continue by determining 622 a type of user interactions associated with the content approved by the user 125. The method 600 can also include determining 624 whether the type of user interactions is of a user specified type. For example, the user specified type may be a view type. If the type of user interactions may not be categorized to the user specified type (e.g., the view type), the method 600 may continue by providing 626 the approved content publicly to the user device 115 or the social network service. Otherwise, the method 600 may move to step 628.

In some implementations, additional restrictions can be applied. Referring to FIG. 6C, the method 600 can include determining 630 whether a restriction applies to making the content publicly available. If a restriction does not apply, the method 600 may continue by providing 632 the content describing the approved action publicly to the user device 115 or the social network service. Otherwise, the method 600 may continue by providing 634 the approved action to a private history of the user 125.

Figure 7A:
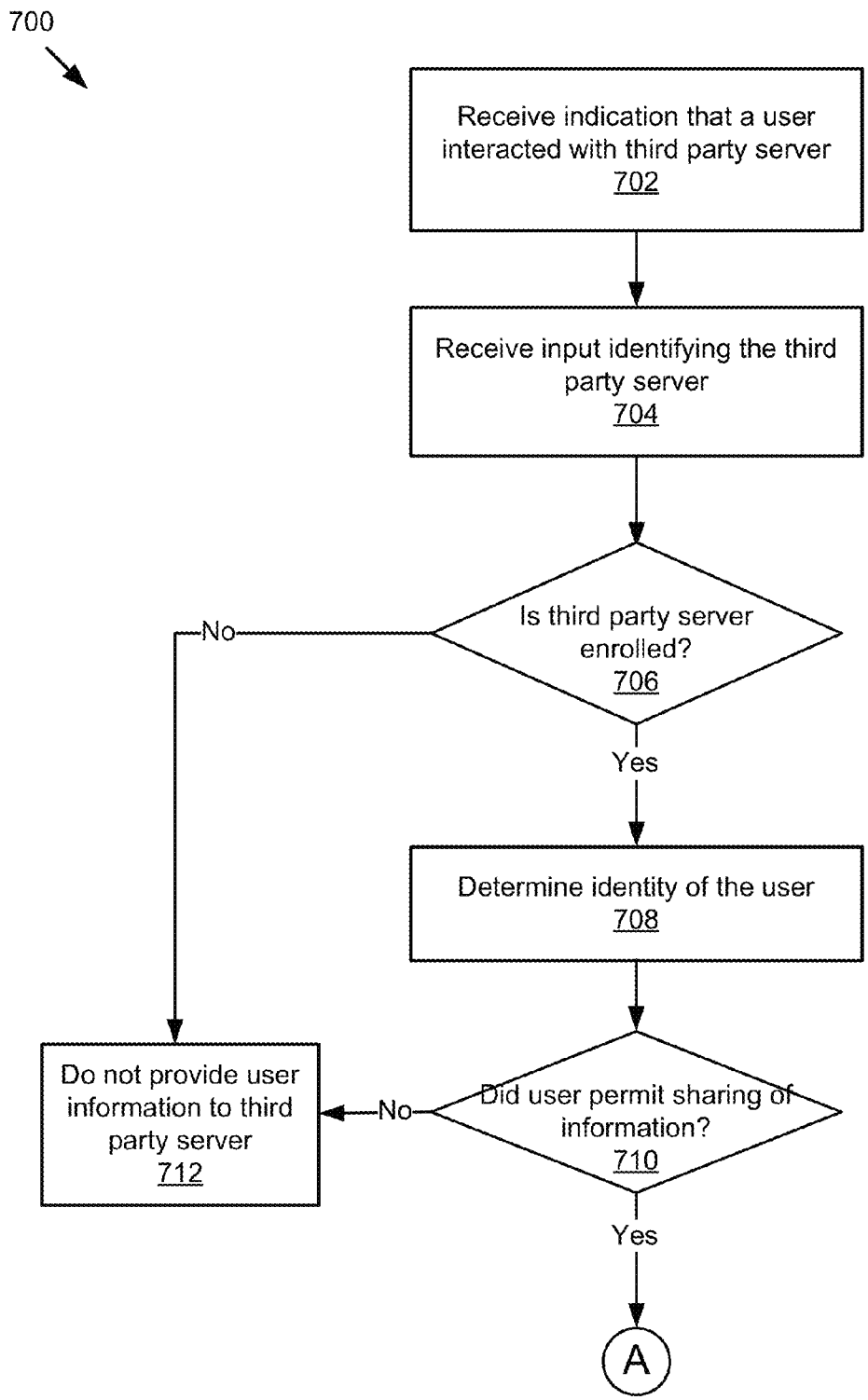
FIGS. 7A-7B are flowcharts of an example method for sharing user information with a third party server.
Figure 7B:
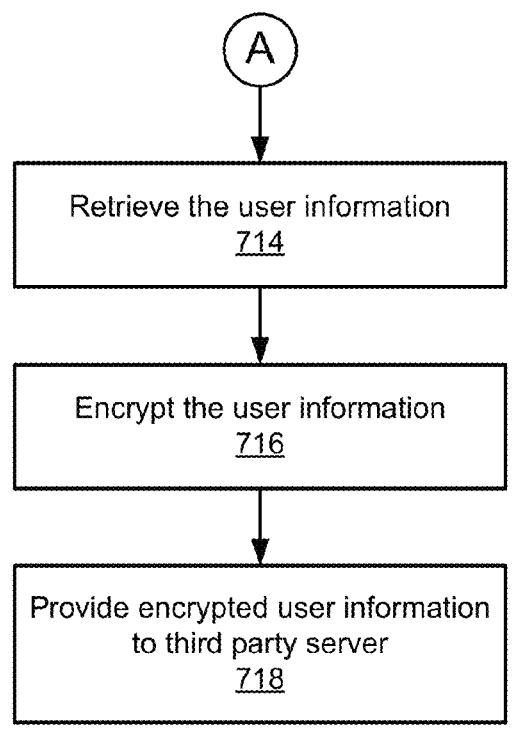

Referring now to FIGS. 7A-7B, an example of a method 700 for sharing user information with a third party server 107 is described. Turning to FIG. 7A, the method 700 can include receiving 702 an indication that a user 125 interacted with a third party server 107. For example, the sharing application 188 receives an indication from a third party server 107 describing that a user 125 logs in a third party site and clicks a widget on the third party site. The indication may also include login information for the user 125. The method 700 can also include receiving 704 an input identifying the third party server 107. For example, the sharing application 188 receives an input from the third party server 107 that includes identity information (e.g., an identity code) about the third party server 107. The method 700 can include determining 706 whether the third party server 107 has been enrolled with the data server 109 or the social network server 101. If the third party server 107 has not been enrolled with the data server 109 or the social network server 101, the method 700 may continue by not providing 712 the user information to the third party server 107.

If the third party server 107 has been enrolled with the data server 109 or the social network server 101, the method 700 may continue by applying additional restrictions before sharing the user information. In the illustrated implementation, the method 700 may continue by determining 708 an identity of the user 125. For example, the sharing application 188 determines an identity of the user 125 based at least in part on the input from the third party server 107 including, e.g., login information of the user 125. The method 700 can also include determining 710 whether the user 125 has permitted sharing of information with the third party server 107. If the user 125 has not permitted sharing of user information, the method 700 may continue by not providing 712 the user information to the third party server 107.

Referring to FIG. 7B, if the user 125 has permitted sharing of user information, the method 700 may continue by retrieving 714 user information for the user 125 from the social graph provided by the social network application 103. The method 700 can also include encrypting 716 the user information and providing 718 the encrypted user information to the third party server 107.

Figure 8:
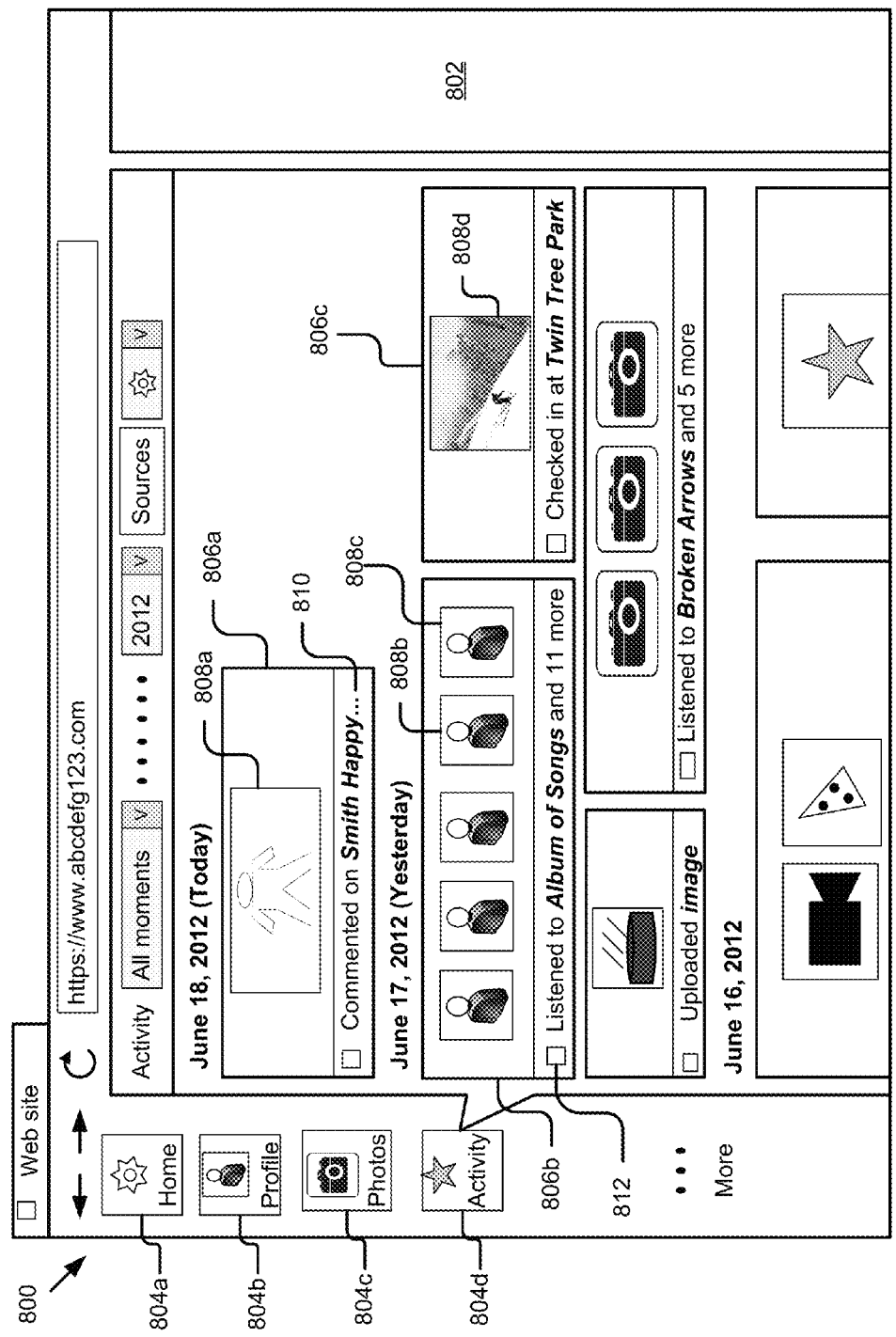
FIG. 8 is a graphic representation of an example user interface of a social network portal displaying activity summaries for a user.

FIG. 8 is a graphic representation of an example user interface 800 of a social network portal 802 displaying activity summaries for a user 125. The social network portal 802 includes various sections accessible by icons 804a, 804b, 804c, 804d. In this graphic representation of an example user interface 800, the section icons 804a, 804b, 804c, 804d are displayed on a display device associated with the user device 115. The user interface 800 includes activity summaries 806a, 806b, 806c. The activity summaries may also be referred to as "share suggestions." Each share suggestion 806a, 806b, 806c may include one or more graphic representations 808a, 808b, 808c, 808d of user activities described by the user activity data. Each share suggestion 806a, 806b, 806c may also include an activity description 810 that describes the user activity.

As illustrated in this representation, user activity is organized and grouped by type of activity (e.g., verbs including "comment," "listen," "upload," "view," etc.) and displayed accordingly. In this example, the activity summaries 806a, 806b, 806c also include a checkbox 812 that may be used to allow the user 125 to approve the information in the share suggestion 806a, 806b, 806c to other users 125 (e.g., the user 125 specifies the content to be provided as described above with reference to FIG. 6A). In other examples, another equivalent mechanism may provide this capability.

Figure 9:
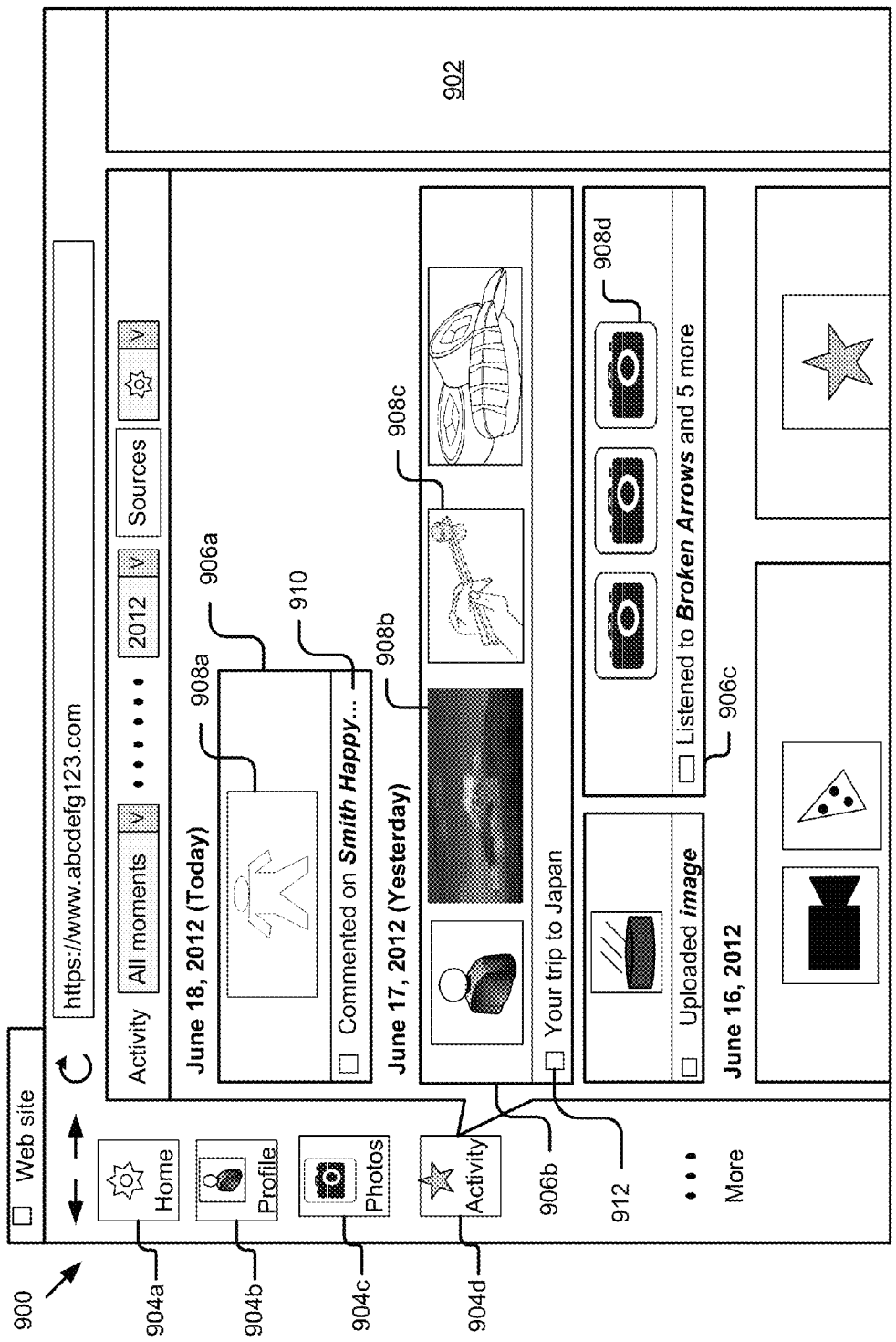
FIG. 9 is a graphic representation of another example user interface of a social network portal displaying activity summaries for a user.

FIG. 9 is a graphic representation of another example user interface 900 of a social network portal displaying activity summaries for a user 125. Similar to the example social network portal 802 depicted in FIG. 8, the social network portal 902 includes various sections accessible by icons 904a, 904b, 904c, 904d. In this graphic representation of an example user interface 900, the section icons 904a, 904b, 904c, 904d are displayed on a display device associated with the user device 115. The user interface 900 includes activity summaries 906a, 906b, 906c. Each share suggestion 906a, 906b, 906c may include one or more graphic representations 908a, 908b, 908c, 908d of user activity. Each share suggestion 906a, 906b, 906c may also include activity description 910.

Similar to the user interface 800, user activity illustrated in this representation of user interface 900 is also organized and grouped by type of activity (e.g., verbs including "comment," "listen," "upload," "view," etc.) and displayed accordingly. In this example, the activity summaries 906a, 906b, 906c also include a checkbox 912 that may be used to allow the user 125 to approve the information in the share suggestion 906a, 906b, 906c to other users 125 (e.g., the user 125 specifies the content to be provided as described above with reference to FIG. 6A). In other examples, another equivalent mechanism may provide this capability.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   transmitting a first input specifying a first type of user interactions and a second type of user interactions;
   receiving, from a third-party service, a set of user activity data describing user interactions of a first user with the third-party service, the user interactions being categorized into one of the first type of user interactions and the second type of user interactions;
   transmitting for display to the first user on a social network service the set of user activity data describing the user interactions of the first user with the third-party service;
   receiving, from the first user, a selection of a second user and a selection of the first type of user interactions;
   determining a subset of user activity data from the set of user activity data based on the first type of user interactions;
   transmitting for display to the second user the subset of user activity data describing the user interactions of the first user with the third-party service;
   receiving, from the first user, an authorization to share user information stored in a social graph of the first user in the social network service with the third-party service; and
   responsive to receiving the authorization from the first user, transmitting the user information stored in the social graph of the first user in the social network service to the third-party service.

2. The method of claim 1, wherein the set of user activity data is transmitted to a data management service.

3. The method of claim 1, wherein the third-party service is provided by a third party server.

4. The method of claim 1, wherein the first type of user interactions is categorized by an action associated with the user activity data.

5. The method of claim 1, wherein the user information is encrypted.

6. The method of claim 1, wherein a private key is transmitted to the third-party service so that the user information can be encrypted.

7. The method of claim 1, wherein the set of user activity data is stored in the social graph of the first user in the social network service.

8. A computer program product comprising a non-transitory computer usable medium including a computer readable program, wherein the computer readable program when executed on a computer causes the computer to:

transmit a first input specifying a first type of user interactions and a second type of user interactions;

receive, from a third-party service, a set of user activity data describing user interactions of a first user with the third-party service, the user interactions being categorized into one of the first type of user interactions and the second type of user interactions;

transmit for display to the first user on a social network service the set of user activity data describing the user interactions of the first user with the third-party service;

receive, from the first user, a selection of a second user and a selection of the first type of user interactions;

determine a subset of user activity data from the set of user activity data based on the first type of user interactions;

transmit for display to the second user the subset of user activity data describing the user interactions of the first user with the third-party service;

receive, from the first user, an authorization to share user information stored in a social graph of the first user in the social network service with the third-party service; and responsive to receiving the authorization from the first user, transmit the user information stored in the social graph of the first user in the social network service to the third-party service.

9. The computer program product of claim 8, wherein the set of user activity data is transmitted to a data management service.

10. The computer program product of claim 8, wherein the third-party service is provided by a third party server.

11. The computer program product of claim 8, wherein the first type of user interactions is categorized by an action associated with the user activity data.

12. The computer program product of claim 8, wherein a private key is transmitted to the third-party service so that the user information can be encrypted.

13. The computer program product of claim 8, wherein the set of user activity data is stored in the social graph of the first user in the social network service.

14. A system comprising:
one or more processors; and
one or more memories storing instructions that, when executed by the one or more processors, cause the system to:

transmit a first input specifying a first type of user interactions and a second type of user interactions;

receive, from a third-party service, a set of user activity data describing user interactions of a first user with the third-party service, the user interactions being categorized into one of the first type of user interactions and the second type of user interactions;

transmit for display to the first user on a social network service the set of user activity data describing the user interactions of the first user with the third-party service;

receive, from the first user, a selection of a second user and a selection of the first type of user interactions;

determine a subset of user activity data from the set of user activity data based on the first type of user interactions;

transmit for display to the second user the subset of user activity data describing the user interactions of the first user with the third-party service;

receive, from the first user, an authorization to share user information stored in a social graph of the first user in the social network service with the third-party service; and responsive to receiving the authorization from the first user, transmit the user information stored in the social graph of the first user in the social network service to the third-party service.

15. The system of claim 14, wherein the set of user activity data is transmitted to a data management service.

16. The system of claim 14, wherein the third-party service is provided by a third party server.

17. The system of claim 14, wherein the first type of user interactions is categorized by an action associated with the user activity data.

18. The system of claim 14, wherein the user information is encrypted.

19. The system of claim 14, wherein a private key is transmitted to the third-party service so that the user information can be encrypted.

20. The system of claim 14, wherein the set of user activity data is stored in the social graph of the first user in the social network service.

* * * * *